Nov. 20, 1923.
R. G. TYRRELL
FISH MEASURE
Filed Oct. 1, 1919
1,474,804
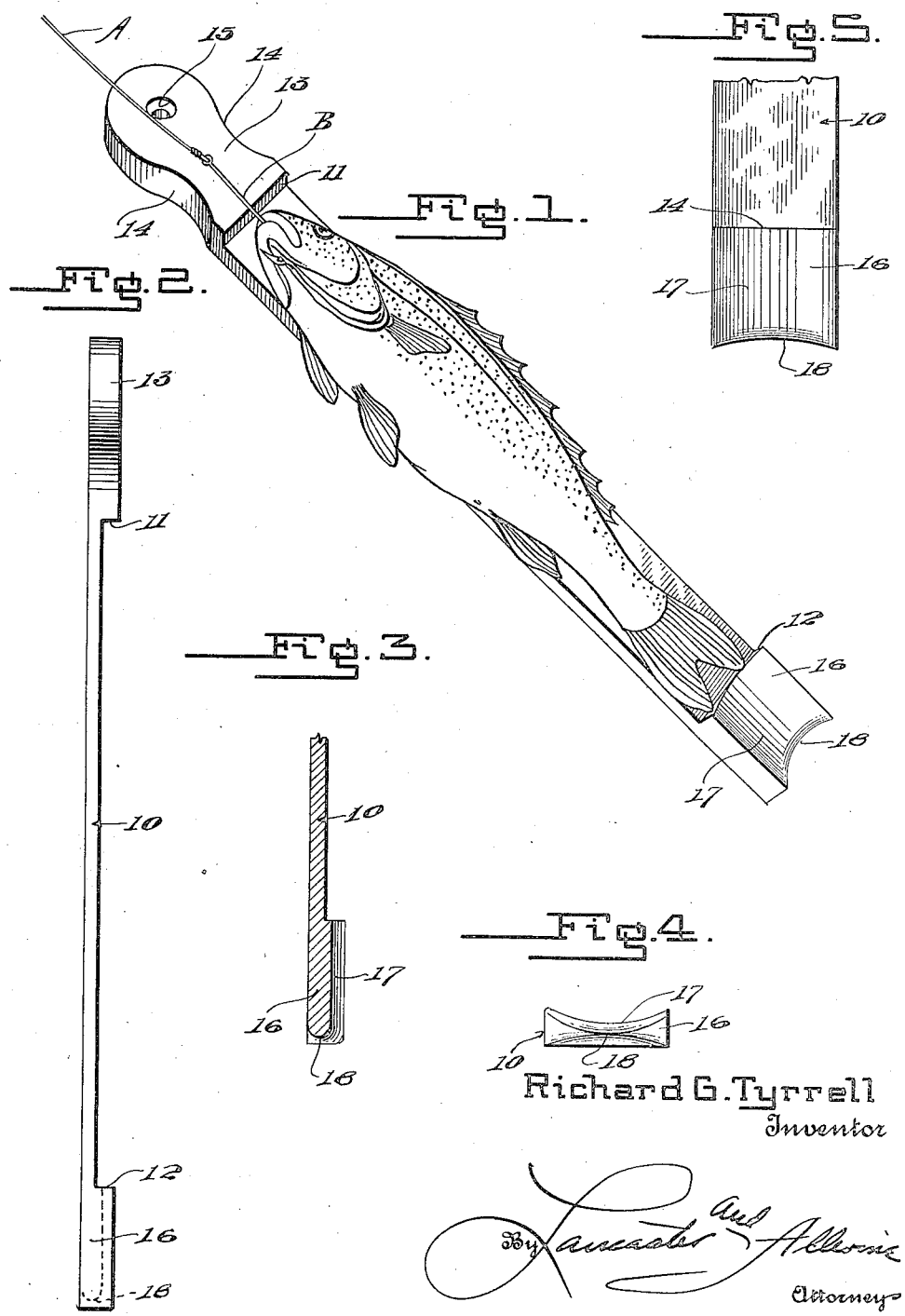
Richard G. Tyrrell
Inventor Patented Nov. 20, 1923.

1,474,804

UNITED STATES PATENT OFFICE.

RICHARD G. TYRRELL, OF CRANBERRY CREEK, NEW YORK.

FISH MEASURE.

Application filed October 1, 1919. Serial No. 327,725.

*To all whom it may concern:*

Be it known that I, RICHARD G. TYRRELL, a citizen of the United States, residing at Cranberry Creek, in the county of Fulton and State of New York, have invented certain new and useful Improvements in Fish Measures, of which the following is a specification.

This invention relates to a measure for measuring fish.

In several of the States, the fish and game laws prohibit the keeping or retaining of fish under certain lengths, and particularly game fish, such as brook trout, bass. or the like. Fishermen employ several methods of determining the length of fish as they are caught so as to put the fish which are under size back in the stream. Among the ways of determining the length of the fish is to cut a notch on the fishing pole, and measure the fish therealong. However, this, owing to the small amount of line generally used for poles employed for game fish or fly fishing is rather difficult, owing to the fact that the fish must be removed from the hook before it can be measured on the pole. This causes rough handling of the fish and in the majority of cases results in the death of the fish so that no advantage is to be obtained by putting him back in the water if he is too small, other than avoiding the liability to fine.

It is an object of this invention to provide a fish measure which includes a pair of spaced shoulders or abutments, the distance between them being the same as the minimum length of fish which the law allows one to keep, over which measure the fish may be drawn while still fastened to the hook, to determine if it is of sufficient length to retain, and if so, the fish can then be removed from the hook and placed in the basket or if too small carefully removed from the hook and returned to the stream from which it was caught; and also to provide a measure wherein the use of graduations of any desired linear measure is eliminated, which graduations become obliterated during the measuring of fish by the slime from the fish body filling or covering the graduations.

Other objects of the invention will appear in the following detailed description taken in connection with the accompanying drawings, forming a part of this specification and in which drawing:

Figure 1 is a perspective view of the improved fish measure showing a fish applied thereto.

Figure 2 is an edge elevation of the fish measure.

Figure 3 is a detail longitudinal section through the fish measure illustrating the manner of concaving one end thereof to facilitate the sliding movement of a fish thereover.

Figure 4 is an end elevation of the improved fish measure, and

Figure 5 is a detail front elevation of the fish measure.

Referring more particularly to the drawings, the improved fish measure 10 is preferably formed of wood, fiber or analogous material, in a single piece, substantially rectangular in shape and provided with a portion of one side thereof cut away to provide spaced shoulders 11 and 12. These shoulders 11 and 12 are spaced apart a distance corresponding to the minimum length of fish which the law allows one to retain. The end 13 of the fish measure is preferably rounded, so as to provide a pair of concaved portions 14 in the opposite edges thereof to receive the thumb and finger of the user of the device, so as to facilitate a firm hold or grip upon the fish measure, and this head 13 is provided with an opening 15 extending therethrough by means of which the fish measure may be suspended from any suitable support, or which hole is preferably provided to receive a string or cord therethrough, by means of which the fish measure may be attached to the clothing of the fisherman, or any other place he desires, so that it will be convenient for use while fishing. The end 16 of the fish measure opposite the end upon which the head 13 is formed has its upper surface concavely cut as clearly shown at 17, in Figures 3 and 4 of the drawings, and its end is also concavely cut and rounded as shown at 18, for eliminating sharp edges or corners, which might have a tendency to injure the fish as it is drawn thereover.

In use, when the angler or fisherman catches a fish, the fishing line A, is gripped, between the thumb and fingers of one hand adjacent the hook B thereon, and the fish measure 10 is held by engagement of the thumb and finger of the other hand with the head 13, and the fish is drawn over the concavely curved end 16, upwardly along the body 10 until its nose engages the shoulder 11, then if the tip of its tail fin extends to or beyond the shoulder 12 the fish is of or over the minimum length which the law allows a fisherman to keep, and the fish may then be placed upon a stringer or in a basket. However, if the fish does not extend from the shoulder 11 to the shoulder 12, it must, in compliance with the law, be returned to the stream from which it was caught.

From the foregoing description taken in connection with the accompanying drawings, it will be readily apparent that a fish measure which is simple in construction and may be manufactured for a small cost, has been devised, as well as one by means of which the angler or fisherman may quickly and easily determine the approximate length of the fish, or rather by means of which he can quickly and easily determine whether the fish is longer than the minimum length permitted to be retained by the law, and fish can consequently be removed from the hook and returned to the stream with minimum injury in case it is too small to be kept.

Changes in details may be made without departing from the spirit of this invention.

I claim:

1. As a new article of manufacture, a fish measure comprising a body having a pair of shoulders formed thereon and spaced at predetermined distances from each other, a gripping head on one end of the fish measure, a face of the end of the body opposite the end upon which the gripping head is formed being concavely curved.

2. As a new article of manufacture, a fish measure comprising an elongated body having one side thereof cut away to provide spaced shoulders positioned at predetermined distances from each other, the face of the body outwardly of one of said shoulders being concavely curved, to facilitate the drawing of a fish thereover.

3. As a new article of manufacture, a fish measure comprising an elongated body having one side thereof cut away to provide spaced shoulders positioned at predetermined distances from each other, the face of the body outwardly of one of said shoulders being concavely curved, to facilitate the drawing of a fish thereover, the end of said body adjacent said concavely curved face being concavely cut and rounded to eliminate sharp edges.

4. As a new article of manufacture, a fish measure comprising an elongated body having one side thereof cut away to provide spaced shoulders positioned at predetermined distances from each other, the face of the body outwardly of one of said shoulders being concavely curved to facilitate the drawing of a fish thereover, the end of said body adjacent the said concavely curved face being concavely cut and rounded to eliminate sharp edges, the end of said body outwardly of one shoulder thereof and remote from the concavely curved end being shaped to form a gripping head.

RICHARD G. TYRRELL.